3,133,040
POLYVINYL ACETATE EMULSIONS WITH UNSATURATED ESTERS

Salvatore G. Sanfilippo, Leominster, Philip L. Gordon, Lexington, and Harry Silverstein, Leominster, Mass., assignors to The Borden Company, a corporation of New Jersey
No Drawing. Filed Feb. 20, 1958, Ser. No. 716,269
1 Claim. (Cl. 260—45.5)

This invention relates to stable polyvinyl acetate (PVAc) emulsions for forming improved films and to the process of making them.

A representative embodiment of the invention is a paint including, as the film forming binder component, a combination of polyvinyl acetate and vinyl crotonate.

When vinyl acetate and vinyl crotonate monomers are copolymerized in emulsified condition there results an unstable emulsion that may coagulate at once.

The present invention provides a combination of polyvinyl acetate with vinyl crotonate or like doubly unsaturated ester additive in such manner as consistently to avoid coagulation, form a stable emulsion, and provide a paint that gives a dried film of scrubbability when immersed in water that is as much as five times as great as that given by a comparable paint omitting the unsaturated ester additive. The increased water resistance or scrubbability is obtained in spite of the fact that vinyl crotonate, for instance, is itself soluble in water to the substantial extent of about 4 parts for 100 of water.

Briefly stated, the invention comprises the process of making a film forming component by the herein described process of reacting emulsified polyvinyl acetate with a monomeric unsaturated ethylenic bond polymerizable ester of an unsaturated aliphatic acid having at least 2 carbon to carbon double bonds to the molecule of the ester. The invention comprises also the product resulting from the process and more particularly what might be called a surface polymer of the said unsaturated ester on the prepolymerized vinyl acetate.

Proceeding as described we obtain an emulsified modified polyvinyl acetate in which only a very small proportion of the reacted unsaturated ester is adequate to give the finished dried paint or other film of the improved properties described.

Once these results have been observed various explanations may be advanced to explain the effect of the minor proportion of the unsaturated ester. We consider that there is transesterification so that, when the unsaturated ester is diallyl maleate, for example, the maleate radical replaces some acetate radical on the surface of the polyvinyl acetate. In this case allyl acetate would be a secondary or by-product. The diallyl maleate reaction, illustrative of those of polyvinyl alcohol with the doubly unsaturated esters, is shown in simplified empirical form in the following equation in which polyvinyl acetate is written as PVAc, Ac is the acetate group, and $n$ is an integral number:

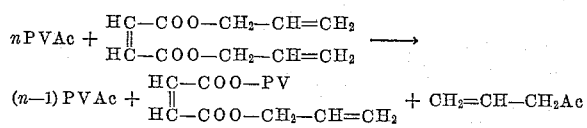

The reaction may progress to the extent that both allyl groups are replaced by vinyls. Either reaction, if written in detail, would reveal that the said unsaturated ester provides, in the transesterified product, ethylenic bonds available for cross linking.

Since the ester interchange or replacement does not proceed to the interior of the prepolymerized polyvinyl acetate units, only a relatively small proportion of the doubly unsaturated ester is adequate to give the surface effect necessary for the improved film.

As to materials, the polyvinyl acetate is any commercial grade in emulsion form. In such emulsions, water is the continuous phase. Emulsion stabilizers are present which are adequate to protect the emulsion under normal conditions as, for example, hydroxyethyl cellulose such as Cellosize, gelatinized starch, carboxymethyl cellulose, dextrin, polyvinyl alcohol, or gum arabic. The proportion of the emulsifying agents are those that are conventional in polyvinyl acetate emulsions as for instance, 1–10 parts for 100 of the polyvinyl acetate on the dry basis and usually about 2–5 parts. We use to advantage such emulsions in which the mean particle size is small. A suitable size is 0.2–0.5 micron, although particles of size within the range 0.1–5 microns may be used for many purposes.

The modifying agent or monomeric unsaturated ethylenic bond polymerizable ester that is reacted with the polyvinyl acetate is of the class illustrated by the allyl and vinyl esters of the unsaturated aliphatic acids maleic, fumaric, citraconic, crotonic, acrylic, methacrylic, ethacrylic, aconitic and carballylic. The esters used are normally the complete esters in which all the carboxylic groups are esterified as in diallyl maleate, triallyl citrate, vinyl methacrylate, and allyl vinyl maleate.

Stabilizers may be introduced if not originally present in the proper amount in the polyvinyl acetate emulsion that is to be treated with the unsaturated ester. If stabilizers are to be added they may be any one of those listed above in the range of proportions shown.

An activator of the reaction is not necessary when the unsaturated ester to be copolymerized on to the surface of the polyvinyl acetate is vinyl crotonate. With the other esters it is either necessary or helpful to accelerate the copolymerization by introducing an activator which may be any one commonly used in ethylenic bond polymerization. Examples of such activators that are particularly satisfactory are benzophenone, benzoyl or acetyl peroxide, peracetic acid and like peroxy organic compounds.

Other conventional components may be included as, for instance, a freezing point depressant such as ethylene glycol, isopropylene glycol, or glycerine.

Pigments of conventional kind and also any usual filler may be incorporated to establish the color or opaqueness of the finished film. Examples of such pigments and fillers are titanium dioxide, ocher, umber, calcium carbonate, magnesium silicate and blue, yellow, green or other pigments to establish color desired.

Surfactants or dispersing agents are suitably introduced to promote the distribution and suspension of pigment. Examples of such surface active agents that are satisfactory are shown in the numbered examples below. They may be any anionic or any nonionic surface active agent known to be useful in pigmented aqueous emulsions of polyvinyl acetate.

Buffers may be used as, for instance, an alkali metal carbonate, phosphate or hydroxide in limited amount to establish the pH of the finished emulsion at a pH within the range 3–5.5.

Proportions of the conventional components are those that are usual in compositions of the present type.

The proportion of the unsaturated ester modifying agent is about 0.2–5% of the dry weight of the polyvinyl acetate, the exact proportion within this range varying somewhat with the particular unsaturated ester selected as the modifying agent. For vinyl crotonate, a satisfactory range is 0.3%–0.5% as the minimum up to 3% as the upper limit. Proportions less than the minimum do not give the increase desired in the resistance of the film to being abraded in the wet scrubbing test. Amounts greater than 5% are ordinarily unnecessary for satisfactory results and, therefore, uneconomical. Also there is decreased benefit when the amount is above a relatively small proportion, the optimum results being obtained with vinyl crotonate, for instance, at about 1.5%–2%.

Proportions that are suitable for all ingredients are shown in the following table as (1) those recommended for best results and (2) a wider range of proportions that are permissible for certain purposes and with certain ester modifiers. In this table and elsewhere herein proportions are expressed as parts by weight on the dry basis unless specifically stated to the contrary.

TABLE

| Ingredient | Parts for 100 PVAc | |
|---|---|---|
| | Recommended | Permissible |
| Unsaturated ester to be copolymerized | 0.5–2 | 0.2–5 |
| Dispersing agent | 1–5 | 0.1–10 |
| Pigments | 100–600 | 0–700 |
| Freezing point depressant | 5–20 | 0–20 |
| Preservative for dispersing agent | 0.1–1 | 0–2 |
| Buffer | To establish desired pH | |
| Water | To establish concentration and viscosity desired | |

The scrubbing test is made in accordance with the details given in Federal Specification TTP 141B, Test Method 614.3, for scrubbability. As we carry out this test, an alkyd resin paint film of wet thickness 0.003" is cast on ground glass and dried for 24 hours, the paint is then cast to a wet film of thickness of 0.006" over the alkyd film and then allowed to dry and cure for 1 week. At the end of this period, the paint film is tested with the Gardner straight line scrubbability machine, the brush being a bristle brush, the brush and supporting boat weighing 1 pound, and the soap used being Bon Ami cake. The brush is first soaked for 30 minutes in water at 25° C., then the bristles rubbed for 500 complete cycles against the soap bar, and the thus soaped brush finally moved backward and forward over the film being tested with the weight resting on the film and with the film and supporting glass plate barely immersed in water. The movement of the brush in reciprocating manner over the film is continued, the brush being rubbed many times against the soap cake after each 500 cycles, until erosion of the film under the bath of the brush showed failure for a length of film of 1.5 inches. The number of complete cycles withstood before the failure is reported as scrubbability or abrasion resistance.

Representative data showing the effectiveness of vinyl crotonate as the unsaturated ester, under these circumstances, on the scrubbability are given in Table I below. The polyvinyl acetate was used in the form of the emulsified copolymer of 80 parts PVAc with 20 of dibutyl fumarate. In each of these compositions there were used the following components in the proportions shown.

TABLE I

Proportion of vinyl crotonate,
percent of PVAc:     Abrasion resistance
0 _____ 250
0.3 _____ 434
0.5 _____ 958
0.75 _____ 1041
1 _____ 1000
1.5 _____ 1022
2 _____ 1030

In a similar series of tests, the emulsified polyvinyl acetate used was a copolymer of 85 parts PVAc with 15 parts vinyl 2-ethylhexoate and was stabilized with gelatinized starch. The abrasion resistance, for various percentages of the vinyl crotonate copolymerized with the PVAc, on the dry basis, were as follows.

Vinyl crotonate, percent:     Abrasion resistance
0 _____ 173
0.3 _____ 193
0.5 _____ 432
0.75 _____ 950
1 _____ 900
1.5 _____ 1748
2 _____ 1562

With diallyl maleate as the unsaturated ester copolymerized with preformed and emulsified polyvinyl acetate and with 1% of benzoyl peroxide on the weight of the maleate, abrasion resistance for the films containing 1%–2% of the maleate on the weight of the PVAc were 35%–53% above those with no diallyl maleate added. With 10% benzophenone as the activator, the resistance for 2% of the maleate was increased by 103%.

The addition of 0.5% and 1% diallyl iticonate, with 10% of benzophenone on the weight of the iticonate, increased the wet abrasion resistance of the PVAc film by 101% and 125%, respectively.

*Example 1*

A composition was made as follows.

Components used in making paste:     Parts by weight
    Water _____ 39
    Titanium dioxide, rutile (pigment) _____ 96.5
    Calcium carbonate, natural (pigment and
      filler) _____ 74.5
    Magnesium silicate (pigment and filler) _____ 39.8
    Silica (pigment and filler) _____ 37.2
    Ethylene glycol (freezing point depressant) __ 17
    Potassium carbonate _____ 1.2
    Soya lecithin (dispersing agent) _____ 5.5
    Ditertiary acetylenic glycol (dispersing
      agent) _____ 3.6
    Ethylene glycol monobutyl ether (coalescing
      agent) _____ 8.5
    Polypropylene glycol (defoamer and leveling
      agent) _____ 1.5
    Sodium salt of carboxylated polyelectrolyte,
      Tamol 731 (dispersing agent) _____ 2
    20% solution of gelatinized amioca starch ___ 30

Components of paint:     Parts by weight
    Above paste _____ 122.
    55% dispersion of PVAc dibutyl fumarate
      copolymer in water with hydroxyethyl cellulose stabilizer _____ 150.
    30% solution of glyoxal in water (insolubilizer
      for the stabilizer) _____ 0.5.
    20% solution of gelatinized amioca starch __ 23.2.
    Phenyl mercuric acetate (biocide) _____ 0.5.
    Water _____ 62.
    Vinyl crotonate, stirred in, 1.5% of dry weight of PVAc.

The scrubbability or abrasion resistance of dried films of the paint is very satisfactory, as shown in Table I.

*Example 2*

The composition and procedure of Example 1 are followed except that there is substituted for the paste any pigment paste for water paint, the paste being one that, in a mixing test, does not give coagulation or precipitation with the other components of our paint constituting the second section of the table of Example 1.

In the pigment paste there is omitted any component the function of which is not desired in the finished product.

*Example 3*

The procedure and composition of Example 1 or 2 are followed except that there is substituted for the vinyl crotonate an equi-molecular proportion of any of the other unsaturated esters described herein.

Example 4

A paint is made of the formula tabulated in Example 1 except that the copolymer used is a 55% dispersion of a copolymer of PVAc and vinyl-2-ethyl hexoate in which dispersion the emulsion stabilizer comprises pregelatinized starch.

It is to be understood that it is intended to cover all changes and modifications of the examples of the invention herein chosen for the purpose of illustration which do not constitute departures from the spirit and scope of the invention.

We claim:

In making a water resistant film forming material, the process which comprises mixing an emulsion of preformed particles of polyvinyl acetate, of size 0.1–5 microns dispersed in water as the continuous medium and in the amount of 100 parts by weight of the acetate on the dry basis, with about 0.2–5 parts of an ester selected from the group consisting of allyl and vinyl complete esters of maleic, fumaric, citraconic, crotonic, acrylic, methacrylic ethacrylic, acontic, and carballylic acids, and benzophenone, and maintaining said acetate, ester and benzophenone in intimate contact and at a pH of about 3–5.5 until reaction of the ester with the surface of the said particles is effected.

References Cited in the file of this patent

UNITED STATES PATENTS

| | | |
|---|---|---|
| 2,155,590 | Garvey | Apr. 25, 1939 |
| 2,155,591 | Garvey | Apr. 25, 1939 |
| 2,558,548 | Eckey | July 26, 1951 |
| 2,611,762 | Luce | Sept. 23, 1952 |
| 2,840,447 | Green | June 24, 1958 |
| 2,861,051 | Caldwell | Nov. 18, 1958 |

FOREIGN PATENTS

| | | |
|---|---|---|
| 706,577 | Great Britain | Mar. 31, 1954 |

OTHER REFERENCES

Du Pont: "Elvanol" (1953), page 37, Du Pont de Nemours & Company Inc., Wilmington 98, Delaware.